United States Patent [19]
Konno et al.

[11] Patent Number: 5,752,030
[45] Date of Patent: May 12, 1998

[54] PROGRAM EXECUTION CONTROL IN PARALLEL PROCESSOR SYSTEM FOR PARALLEL EXECUTION OF PLURAL JOBS BY SELECTED NUMBER OF PROCESSORS

[75] Inventors: Chisato Konno, Inagi; Toshio Okochi, Kokubunji, both of Japan

[73] Assignee: Hitachi, Ltd., Tokyo, Japan

[21] Appl. No.: 101,993

[22] Filed: Aug. 4, 1993

[30] Foreign Application Priority Data

Aug. 10, 1992 [JP] Japan ................... 4-212578

[51] Int. Cl.⁶ ................... G06F 9/40; G06F 15/16
[52] U.S. Cl. ................... 395/672; 395/671; 395/670; 395/676; 395/572
[58] Field of Search ................... 395/650, 700, 395/800, 672, 673, 674, 671, 670, 676, 572

[56] References Cited

U.S. PATENT DOCUMENTS

| | | | |
|---|---|---|---|
| 4,727,487 | 2/1988 | Masui et al. | 395/67 |
| 4,852,001 | 7/1989 | Tsushima et al. | 705/8 |
| 4,890,227 | 12/1989 | Watanabe et al. | 395/23 |
| 5,179,702 | 1/1993 | Spix et al. | 395/672 |
| 5,210,872 | 5/1993 | Ferguson et al. | 395/672 |
| 5,303,369 | 4/1994 | Borcherding et al. | 395/674 |
| 5,307,478 | 4/1994 | Rasbold et al. | 395/500 |
| 5,325,525 | 6/1994 | Shaw et al. | 395/674 |

FOREIGN PATENT DOCUMENTS 3-43835  2/1991  Japan .

*Primary Examiner*—John E. Harrity
*Assistant Examiner*—John Follansbee
*Attorney, Agent, or Firm*—Fay Sharpe Beall Fagan Minnich & McKee

[57] ABSTRACT

In submitting each job in a parallel processing system provided with a plurality of processors, execution conditions such as a requested minimum processor number, an upper limit used processor number and a requested execution time are designated for each job and the judgement of whether or not processors equal in number to the requested minimum processor number required by a leading one of execution waiting jobs are in idle states is made for the leading job by use of a table for managing the status of utilization of processors for each job executed and the number of idle processors, a table for managing processors occupied or used by each operating job and a lapse time and a table for managing the execution conditions of each execution waiting job. When idle processors to be assigned are lacking, information in the above tables is used to judge whether a wait until processors corresponding to a number required by that job become idle states is taken without activating a subsequent job or the subsequent job should be activated ahead.

6 Claims, 4 Drawing Sheets

EXECUTION WAITING MANAGEMENT TABLE  ⟋2

| JOB NAME | REQUESTED MINIMUM PROCESSOR NUMBER | UPPER LIMIT USED PROCESSOR NUMBER | REQUESTED EXECUTION TIME | WAIT TIME | POINTER TO PROGRAM |
|---|---|---|---|---|---|
| WJOB1 | PM1 | PU1 | $TE_1$ | TM1 | |
| ⟩ | ⟩ | ⟩ | ⟩ | ⟩ | ⟩ |
| WJOBn | PMn | PUn | $TE_n$ | TMn | ADDRESS n |
| 21 | 22 | | 23 | 25 | 24 |

WAITING SEQUENCE ↓

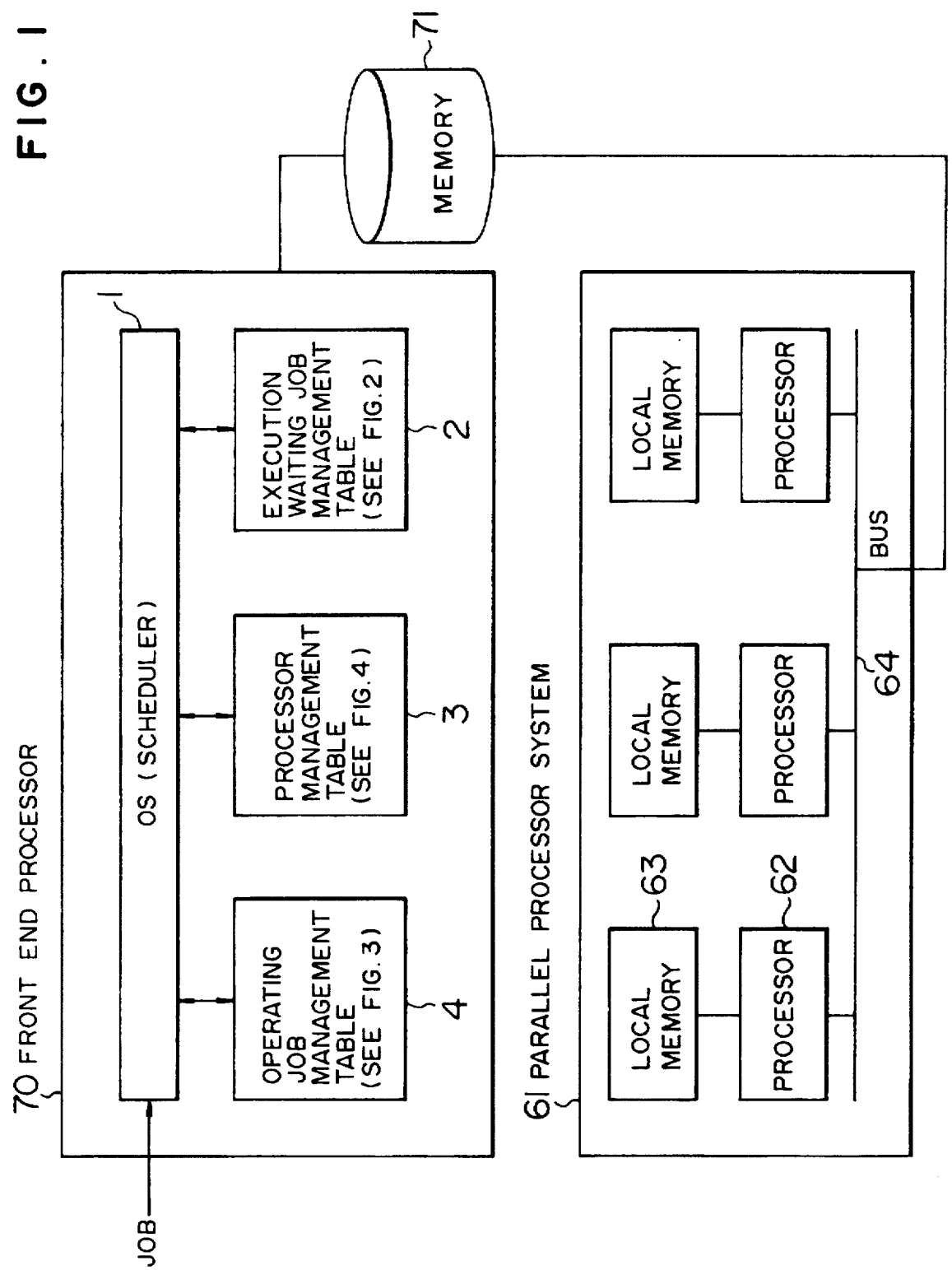

FIG. 2

EXECUTION WAITING MANAGEMENT TABLE (2)

| JOB NAME | REQUESTED MINIMUM PROCESSOR NUMBER | UPPER LIMIT USED PROCESSOR NUMBER | REQUESTED EXECUTION TIME | WAIT TIME | POINTER TO PROGRAM |
|---|---|---|---|---|---|
| WJOB1 | PM1 | PU1 | $TE_1$ | $TM_1$ | |
| ~ | ~ | ~ | ~ | ~ | ~ |
| WJOBn | PMn | PUn | $TE_n$ | $TMn$ | ADDRESS n |
| 21 | 22 | 23 | 25 | 24 |

↓ WAITING SEQUENCE

FIG. 3

OPERATING JOB MANAGEMENT TABLE (4)

| JOB NAME | USED PROCESSOR NUMBER | REQUESTED EXECUTION TIME | REMAINING TIME TO JOB DISCONTINUATION | EXECUTION START INSTANT |
|---|---|---|---|---|
| EJOB1 | $PE_1$ | $TE_1$ | $TR_1$ | |
| ~ | ~ | ~ | ~ | ~ |
| EJOBm | $PE_m$ | $TE_m$ | $TR_m$ | |

PROCESSOR MANAGEMENT TABLE

| LAPSE TIME | SUM OF NUMBERS OF IDLE PROCESSORS |
|---|---|
| 0 | $PV_0$ |
| $TF_1$ | $PV_1$ |
| ⁝ | ⁝ |
| $TF_R$ | $PV_R$ |

$h, g, \ell, f$ : FUNCTION

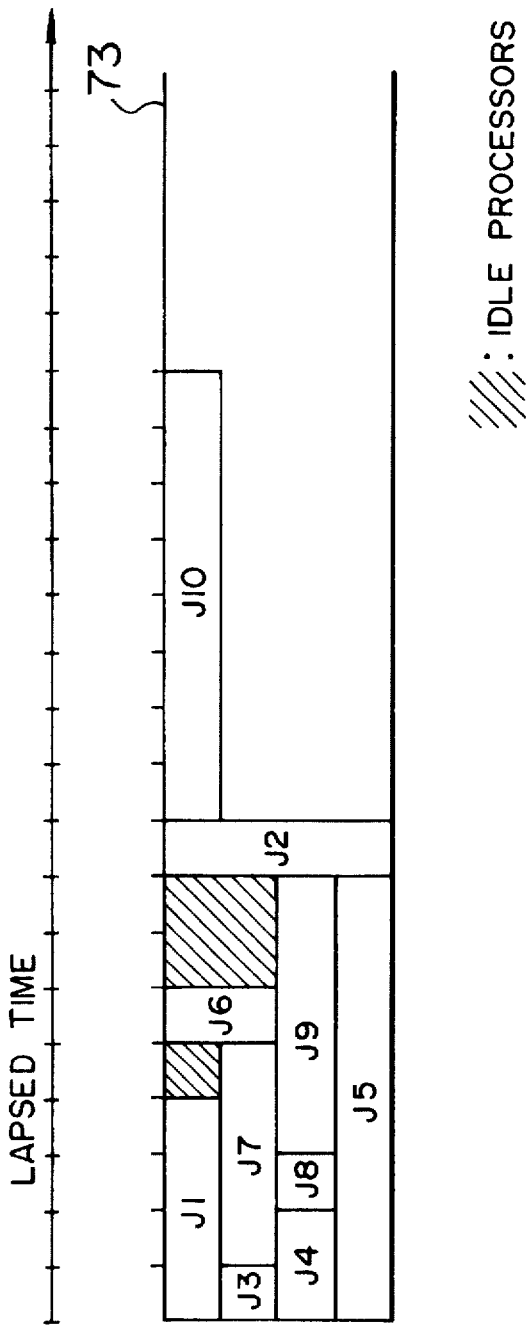

PROGRAM EXECUTION CONTROL IN PARALLEL PROCESSOR SYSTEM FOR PARALLEL EXECUTION OF PLURAL JOBS BY SELECTED NUMBER OF PROCESSORS

(BACKGROUND OF THE DISCLOSURE)

The present invention relates to a program scheduling method for enhancing the rate of operation of elemental processors of a parallel processor system or parallel computer when the parallel processor system is used in common by a multiplicity of unspecified users.

When the number of plural processors forming a parallel processor system is increased, it is desirable to avoid a method in which those processors are occupied by one program (or job) and to obtain a method in which those processors are divided into a plurality of groups for assignment to a plurality of jobs so that the jobs are executed in parallel. In this case, at the point of time when the execution of any job is completed, plural jobs waiting for execution are properly scheduled in accordance with the number of idle processors at that time so that they are executed by the parallel processor system.

A problem associated with this scheduling is how to determine the number of processors which are to be allotted to each job.

According to one method for solving this problem, the required number of processors is determined beforehand for each job.

One method for securing the determined number of processors has been disclosed by JP-A-3-43835. In the disclosed method, a job is provided with an instruction train included therein for securing the number of processors required by that job and the instruction is executed at the time of execution of that job to secure the number of processors.

(SUMMARY OF THE INVENTION)

In the above-mentioned method in which the number of processors to be used at the time of program execution is determined beforehand for each program or job and the required number of processors are assigned when that job is to be executed, the efficiency of utilization of processors becomes low since only a number of processors that are predetermined as required are used. When the available processors are smaller in number than the required number then they are left without being used even if those processors are in idle states. This problem becomes remarkable as the number of processors required by a job waiting for execution is increased.

An object of the present invention is to solve the above problem or to provide a program execution control method in a parallel processor system for obtaining the enhanced efficiency of utilization when the parallel processor system is used by a multiplicity of unspecified users at the same time.

In the present invention, a requested minimum processor number, a requested upper limit used processor number and a requested job execution time are registered for each of the jobs awaiting execution. Using the registered information, the following is performed. The judgement is made as to whether or not the number of processors in idle states is not smaller than (i.e., greater or equal to) the requested minimum processor number required by a leading one of the execution waiting jobs. In the case where the former is not smaller than the requested number, the leading execution waiting job is activated. In the case where the number of idle processors is smaller than the requested number, an instant of time is predicted at which a number of idle processors larger than the requested minimum processor number required by the leading execution waiting job become available. On the basis of a time lapsed from the present instant of time to the predicted instant of time, the requested execution time required by the leading job, the requested minimum processor number required by the leading job and a cumulative execution wait time of the leading job until the present instant of time, the judgement is made as to whether a wait for a number of idle processors not smaller in number than the requested minimum number of processors required by the leading job is to be taken without activating a job subsequent to the leading job or the subsequent job should be activated.

(BRIEF DESCRIPTION OF THE DRAWINGS)

FIG. 1 is a block diagram showing the construction of the whole of a parallel processor system to which the present invention is applied;

FIG. 2 is a diagram showing the contents of an execution waiting job management table used in the parallel processor system shown in FIG. 1;

FIG. 3 is a diagram showing the contents of an operating job management table used the parallel processor system shown in FIG. 1;

FIG. 6 is a diagram showing a specific example of the scheduling performed by the parallel processor system shown in FIG. 1; and FIG. 7 is a diagram showing the contents of an execution waiting job management table which concerns a plurality of jobs used in the specific example shown in FIG. 6.

(DESCRIPTION OF THE PREFERRED EMBODIMENTS)

Figures 4, 5:
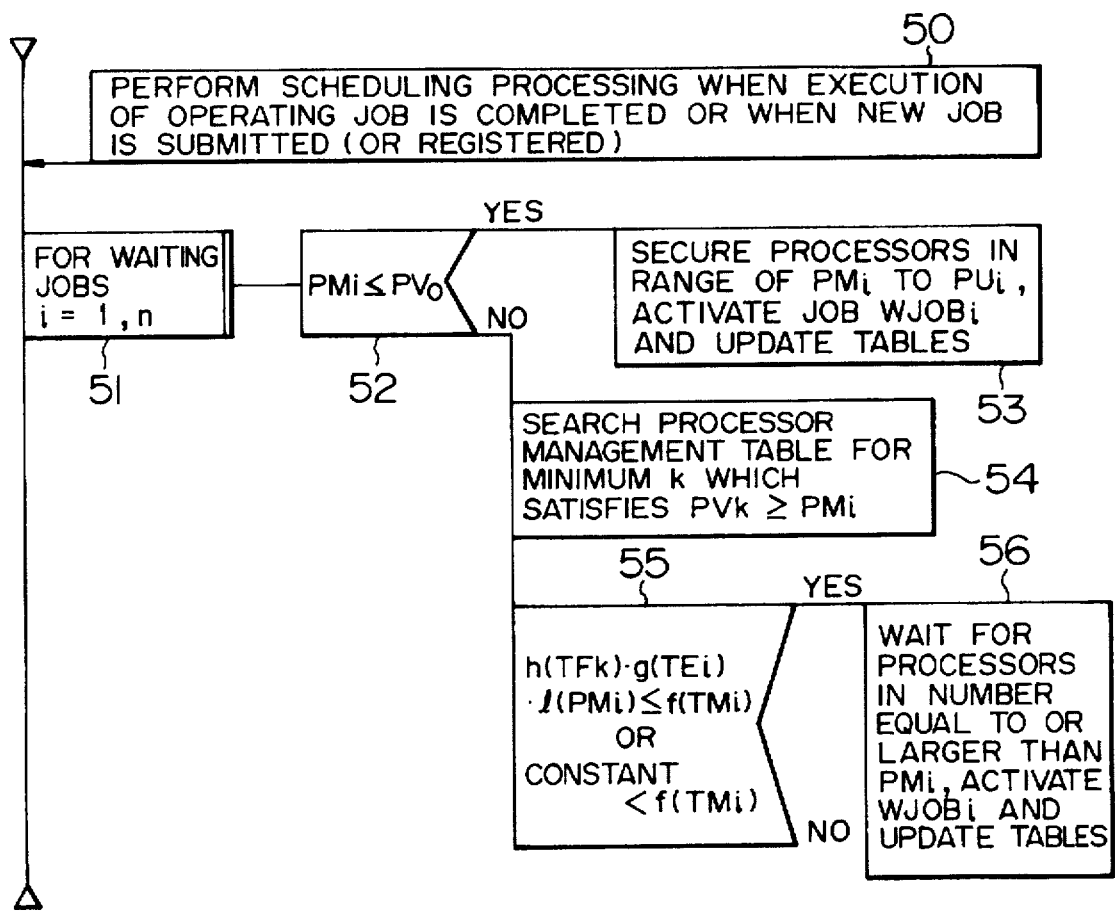
FIG. 4 is a diagram showing the contents of a processor management table used in the parallel processor system shown in FIG. 1.
FIG. 5 is a flow chart of a scheduling performed by an operating system or scheduler of the parallel processor system shown in FIG. 1.

Embodiments of the present invention will now be explained in reference with the accompanying drawings.

FIG. 1 shows the construction of the whole of a processor system or computer system to which the present invention is applied. In FIG. 1, reference numeral 61 denotes a parallel processor system or parallel computer provided with a plurality of processor elements each of which includes a processor 62 and a local memory 63 for the processor 62. The local memory holds therein a program executed by the corresponding processor and data used in the program. These processors are connected to a front end processor 70 through a bus 64. A plurality of jobs to be executed are inputted to a memory 71 associated with the front end processor 70. A main function of the front end processor 70 is to determine timings at which those jobs are to be executed and the available processors which are to execute the jobs. For simplification, an input device for jobs is not shown in FIG. 1.

Jobs submitted or subjected to requests for execution (or the units of execution request to the processor system) are registered in an execution waiting job management table 2 by an operating system 1 (hereinafter referred to as OS) in the order of generation of execution requests.

Generally, the submission is carried out by designating the locations of a program and data necessary for execution of a job, the amount of a resource request to the processor system side, and so on.

The submission of a job is made by use of a job control language or command.

In the present embodiment, at the time of submission of each job, (1) a requested minimum processor number representing the minimum number of processors required for execution of that job, (2) an upper limit used processor number representing the upper limit number of processors to be used at the time of execution of that job, (3) a requested execution time representing the maximum execution time to be consumed for the execution of that job when the job is executed with the requested minimum number of processors assigned to the job (or in other words, a time indicating that the execution of the corresponding job is to be discontinued in the case where the execution of that job is not completed when the requested execution time has lapsed after the start of execution of the job), and (4) the address of a storage location of that job in the memory 71 are all designated.

As shown in FIG. 2, the execution waiting job management table 2 holds the name WJOBi of each job as well as the minimum processor number PMi (21), a requested upper limit used number PUi (22) and a requested execution time TEi (23) which are inputted with respect to that job. The table 2 further holds a pointer (24) indicative of a storage address of that job in the memory 71 and an execution waiting time TMi (25) of that job after a request for execution of that job is made.

As shown in FIG. 3, an operating job management table 4 is a table for holding the status of execution concerning jobs which are presently operating, and holds the number PEi of processors used by each job EJOBi, the instant of time of start of execution of that job and a remaining time TRi to discontinuation of that job. The remaining time to discontinuation is a time which remains until the discontinuation of that job in the case where the execution of the job is not completed. This remaining time to discontinuation is determined from a requested execution time designated for that job and a time lapsed after the start of execution of that job.

A requested execution time of each job is the instant of time at which the execution of that job can be discontinued in the case where that job is executed with the minimum processor number designated by a user being assigned to that job. In the present embodiment, however, processors in number between the minimum number and the maximum number are assigned to each job, as will be mentioned later on. Accordingly, in the case where processors larger in number than the minimum number are assigned to each job, a time lapsed from the start of execution of that job to the instant of time at which the execution of that job can be discontinued (or a corrected requested execution time) may be shorter than a requested execution time TEi designated by the user. Namely, the requested corrected execution time can be selected to be approximately (the requested execution time required by the user)×(the ratio of the number of processors assigned to that job to the requested minimum number of processors required for that job by the user) In this case, the remaining time to discontinuation is the subtraction of the time of lapse after the execution of that job from the corrected requested execution time.

In general, the time of execution of a job is not proportional to the number of processors assigned to that job. For example, even if that job is executed by two processors, the time of execution of that job is not reduced to half. Accordingly, the calculation of the corrected requested execution time mentioned above becomes more accurate when it is made on the basis of a calculation which is not proportional to the above-mentioned processor number ratio However, the requested execution time itself is a time for determining whether or not the execution of a job is to be discontinued when the execution of that job requires an abnormally long time. Therefore, the value of the requested execution time itself is not absolutely important. In other words, the time is a standard for discontinuation. Accordingly, in the present embodiment, it is assumed that the above-mentioned corrected requested execution time is calculated in the above-mentioned manner for the sake of simplification.

As shown in FIG. 4, a processor management table 3 is a table for managing the status of utilization of processor elements and holds a predicted value of the number PVk of idle processors in a time TFk lapsed from the present instant of time to each of various future instants of time.

The number of PVk of idle processors is determined by the OS 1 by use of the number PV0 of present idle processors, a remaining time TRi to discontinuation and the number PEi of processors used for each operating job shown in the table 4. Namely, remaining times TRm to job discontinuation are sorted to determine a train {TFk} of predicted lapse times having an increase in the number of idle processors and PVk is determined from the sum of PVK and the summation of the used processor numbers PEi associated with TRi shorter than each TFk. The representation using an equation provides PVk=(ΣPEi)+PV0, Σ being a summation concerning all i's which provide TRi<TFk.

The future lapse time TFk herein used is a time by which the remaining time to discontinuation of each job under execution lapses from the present point of time.

Next, the overall processing flow of a scheduling will be explained using FIG. 5.

The OS 1 updates the contents of the above-mentioned tables when the execution of any one of jobs under execution is completed or each time a request for execution of a new job is made (step 50). Thereafter, the OS selects a leading job from among execution waiting jobs (step 51) to perform the following processing for the selected job.

The judgement is made as to whether or not the number PV0 of idle processors is not smaller than the requested minimum processor number PMi required by the selected job (step 52).

In the case where there are idle processors not smaller in number than the requested minimum number PMi, idle processors are secured for that job so that the number of idle processors is as large as possible within a range between the requested minimum number PMi and the requested upper limit number PUi (step 53). Namely, if the number PV0 of idle processors is smaller than the upper limit number PUi to be used, idle processors equal in number to PV0 are assigned to that job. If the number PV0 of idle processors is larger than the upper limit used number PUi, idle processors equal in number to PUi are assigned to that job.

Step 53 further includes updating the tables 2, 3 and 4 and activating that job.

For the activation, the front end processor 70 transfers a program of that job from the memory 71 to the local memories 63 connected to the secured processors. At this time, there is also transferred information such as identifiers of the secured processors which is necessary for executing that job by the secured processors in a distributed manner In the present embodiment, the reasons why the number of processors assigned to each job is selected to be not smaller than the minimum number PMi is that the job is executed at a rate close to a rate expected by a user or with the minimum number of processors required by the job.

Further, the reason why the number of processors assigned to a job to be activated is selected to be not larger than the maximum number PUi is that the execution of the job at a rate close to the maximum execution rate expected by a user results in the satisfaction of the user's demands for scheduling and even if processors in number larger than the optimum number required by a job is assigned to that job, the execution rate has generally no particular increase.

When the number PV0 of idle processors is smaller than the minimum number PMi required by that job (step 52), the activation of that job is suspended. In that case, the judgement is made as to whether that job is to be activated after a wait until processors not smaller in number than the minimum number PMi required by that job or the execution of a job subsequent to that job is possible getting ahead of that job, as will be mentioned in the following.

First, the processor management table 3 is searched to determine a predicted lapse time TFk until processors equal in number to a number required by a leading job are released (step 54).

Next, the judgement is made as to whether or not the predicted lapse time TFk thus determined (or the maximum wait time until that job can operate) and information of that job registered in the tables 2 and 4 (more particularly, a requested minimum processor number PMi, a requested execution time TEi and a cumulative wait time TMi until the present instant of time) satisfy a predetermined conditional relation (step 55).

This conditional relation is defined in order that if the number PMi of processors occupied and the requested execution time TEi are small and wait until an operation possible time instant TFk is small and if the cumulative wait time TMI is long in a certain degree, a wait is taken until processors equal in number to the minimum number required by that job become idle.

For example, provided that each of functions h, g, l and f is a linear function and the coefficients of parameters TFk, TEi, PMi and TMi are positive numbers, the following conditional relations may be considered:

(certain constant)<$f(TMi)$ or $h(TFk)*g(TEi)*l(PMi)<f(TMi)$ where the parameters concerning the time or instant of time are measured at a predetermined unit.

The latter relation is a condition which is easily satisfied when TFk, TEi and PMi are small and TMi is large. If PMi and TEi are small and the wait until an operation possible time instant TFk is little and if the cumulative wait time TMi is long in a certain degree, as mentioned above, this relation provides a condition for executing the corresponding job.

The former relation is a condition for making it possible to surely execute a job which has a wait for a time longer than a certain prescribed time. The former relation can be interpreted as being substantially a special case of the latter relation. However, when the cumulative wait time TMi exceeds a certain limit, a wait until processors required by the leading job become idle states is taken irrespective of the values of the other parameters and without activating the subsequent job.

The simplest forms of the functions h, g, l and f are the variables of these functions themselves. At this case, the above conditional relations are TFk * TEi * PMi<TMi or constant<TMi.

When it is determined in step 55 that a leading job at this time satisfies either one of the above relations, the scheduling for that job is frozen and a wait for processors not smaller in number than PMi becoming idle is taken to secure the processors (step 56). Step 56 further includes activating that job and updating the tables 2, 3 and 4.

In a period of time when a wait is taken in this state, the tables 2, 3 and 4 are updated each time the completion of each job is reported. And, if PV0 is larger than PMi at that point of time, a leading job at this time is activated.

When it is determined in step 55 that a leading job at this time does not satisfy the above relations, the processing of steps 52 to 56 are performed for a job subsequent to that job. If step 52 for the subsequent job determines that there are idle processors equal in number to the minimum number required by the subsequent job, the processing of step 53 is performed for the subsequent job. In this case, this subsequent job is activated taking ahead of the above-mentioned leading job.

However, in the case where step 55 for the subsequent job determines that the scheduling should be frozen until processors equal in number to a number required by that job become idle states, the processing of step 56 is performed for the subsequent job.

Thus, the processing of steps 52 to 56 are repeated until the processing of step 53 or step 56 is performed for any job.

In the case where the processing of step 53 or step 56 is performed for any job,the scheduling at this point of time is completed. Thereafter, when the execution of a job under execution is completed or when a request for execution of a new job is inputted, the scheduling is repeated again from step 50.

FIG. 6 shows an example of the operation of the processors according to the above-mentioned scheduling The shown example is an example of a scheduling for a plurality of jobs shown in a main part of the execution waiting job management table 2 shown by way of example in FIG. 7. The shown example concerns the case where the total number of processors is eight.

Though a job J2 requires at least eight processors, such a number of processors are not brought into idle states during the execution of a job J1. Therefore, without waiting for such a number of processors being brought into idle states, subsequent jobs J2, J3, J4 and J5 each requiring at least two processors are successively activated each time two processors become idle. Though a job J6 requires at least four processors, subsequent jobs J7, J8 and J9 each requiring at least two processors are activated without having a wait until four processors become idle. At the point of time when the job 1 is completed, only two processors are idle. Therefore, a leading one J2 of the execution waiting jobs still remains unactivated but the judgement for the next execution waiting job J6 based on the above conditional relations results in that a wait for the completion of the job J7 is taken and the job J6 is activated at the point of time when the job J7 is completed. Thus, the job J6 is activated at the point of time of completion of the job J7.

At the point of time when the job J6 is completed, the leading one J2 of the execution waiting jobs encounters a long cumulative lapse time. Therefore, a wait until eight processors required for the job J2 become idle is taken without activating the other jobs. Thus, the job J2 is activated at the point of time of completion of the jobs 5 and 9 and a leading one J10 of the remaining jobs is activated after the job J2 is completed.

From this example, it can be understood that the efficiency of utilization of processors is enhanced in such a manner that when the number of idle processors required by a leading one of execution waiting jobs is not available, one(s) of subsequent jobs requiring processors smaller in number that the number required by the leading job is activated But, the job with the execution thereof deferred is prevented from being left unactivated for any length of time.

In the case where a job requiring the entire number of processors of the parallel processor system as an upper limit used processor number PUi is submitted, the designation of the upper limit used processor number can be omitted. Similarly, in the case here a job requiring one as a requested minimum processor number PMi is submitted, the designation of the requested minimum processor number can be omitted.

The following modifications of the scheduling can be considered.

(1) Step 55 of FIG. 3 may be changed in such a manner that the judgement is made only as to whether or not the cumulative wait time TMi exceeds a predetermined value. In this case, step 54 is omitted.

(2) The conditional relation in step 55 concerning the operation wait time TFk, the requested execution time TEi, the requested minimum number PMi and the cumulative wait time TMi may be changed to a conditional relation concerning the operation wait time TFk and the cumulative wait time TMi, that is, a conditional relation for judging whether or not the ratio f(TMi)/h(TFk) of the function h(TFk) and the function f(TMi) exceeds a predetermined value. When this product exceeds the predetermined value, the flow proceeds to step 56.

Thus, when the time TMi becomes long in certain degrees and the time TFk becomes short, a wait by a leading one of execution waiting jobs until processors not smaller in than a number required by the leading job becomes idle is taken without activating a subsequent job.

(3) Step 52 of FIG. 3 can be changed so that the execution of a leading one of execution waiting jobs is determined taking a requested execution time TEi of the leading job into consideration.

Namely, in the case where the time TEi is considerably long, for example, in the case where the time TEi is longer than a fixed time, the execution of the leading job is prevented even if idle processors not smaller in number than the minimum processor number required by that job are available and the judgement is made as to whether or not the activation of the next execution waiting job is possible Thus, the priority of a job occupying processors for a long time is lowered.

(4) In step 53 of FIG. 3, the number of processors to be used in a range not smaller than the requested minimum processor number PMi and not larger than the minimum value min(PV0, PUi) between the number PV0 of idle processors and the upper limit used processor number PUi can be determined depending on the requested minimum processor number required by a subsequent job. For example, in the case where there is a subsequent execution waiting job which requires processors not larger in number than a difference between the number PV0 of idle processors and the requested minimum processor number PMi, the number of processors corresponding to the subtraction of the minimum processor number required by this subsequent job from the number of idle processors is assigned to the leading execution waiting job. Thereby, the continuous activation of the leading execution waiting job and the subsequent execution waiting job becomes possible and the simultaneous operation of jobs larger in number as compared with the foregoing embodiment.

(5) It is not necessary that the functions h, g, l and f in step 55 of FIG. 3 are used in fixed forms. Parameters of the functions may be changed dynamically by experiences or the forms of the functions themselves may be changed by a practical use.

For example, if there occurs frequently the case where a wait time becomes longer than a certain value, only a job requiring a smaller number of processors or a shorter execution time can be run in a certain time zone by moderating the conditional relation or by having the function g or l take a sufficiently large value in a certain time zone for an independent variable larger than a certain standard by a practical use.

(6) It may be preferable that in step 56 of FIG. 3, instead of merely having a wait for the maximum wait time TFk until processors not smaller in number than the requested minimum processor number PMi become idle states, one or plural subsequent jobs being completed within the maximum wait time TFk and capable of being executed by processors not larger in number than the present number PV0 of idle processors are activated if any. In this case, the maximum wait time TFk is not changed.

(7) Though the foregoing embodiment has been shown in conjunction with the example in which all jobs are schedules in accordance with a waiting sequence, it is also possible to provide a class for a group of jobs each requiring processors the number of which is within a certain range, so that specified processor groups are respectively assigned to such classes to perform the above-mentioned scheduling in each class.

The problems including the assignment of processors and the total throughput, which may arise in executing a plurality of jobs by a parallel processor system, can be solved, thereby making it possible to enhance the efficiency of utilization of processors when the parallel processor system is used by a multiplicity of unspecified users simultaneously.

Also, an enormous job requiring a multiplicity of processors can be prevented from remaining unscheduled throughout because of the interruption by small jobs.

We claim:

1. A job execution control method in a parallel processor system provided with a plurality of processors, comprising the steps of:

(a) storing, for each of a plurality of jobs waiting for execution thereof in the parallel processor system, a requested processor number which is designated with respect to that job and which represents a requested minimum processor number required for executing said each job, an upper limit used processor number representative of an upper limit number of processors to be used for each of the execution waiting jobs, and a requested execution time which represents a maximum job execution time when that job is executed by processors equal in number to the requested processor number stored for that job;

(b) judging, at a point of time when some idle processors are generated, whether or not the requested processor number stored for an earliest one of the plurality of execution waiting jobs for which a request for execution is issued earliest is not larger than the total number of generated idle processors;

(c) assigning processors not smaller in number than the requested processor number and not larger than the upper limit used processor number stored for the earliest job, to the earliest job to activate the earliest job in the case where said judging in said step (b) is that the requested processor number stored for the earliest job is not larger than the total number of generated idle processors;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor stored for that job, but a processor number assigned to that job, on the basis of the requested minimum processor number stored for that job, the processor number assigned to that job and the requested execution time stored for that job;

(e) predicting a time of lapse from a present instant of time to a time when a generation of idle processors is not smaller in number than the requested processor number stored for the earliest job on the basis of a predicted completion time instant of each job under execution;

(f) judging, which of the earliest job and one of jobs subsequent to the earliest job should be activated preferentially for improved system throughput, on the basis of at least the predicted lapse time;

(g) waiting for the generation of idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially; and (i) executing the jobs with the processors.

2. A job execution control method in a parallel processor system provided with a plurality of processors, comprising the steps of:

(a) storing, for each of a plurality of jobs waiting for execution thereof in the parallel processor system,
a requested processor number which is designated with respect to that job and which represents a requested minimum processor number required for executing said each job,
an upper limit used processor number representative of an upper limit number of processors to be used for each of the execution waiting jobs, and
a requested execution time which represents a maximum job execution time when that job is executed by processors equal in number to the requested processor number stored for that job;

(b) judging, at a point of time when some idle processors are generated, whether or not the requested processor number stored for an earliest one of the plurality of execution waiting jobs for which a request for execution is issued earliest is not larger than the total number of generated idle processors;

(c) assigning processors not smaller in number than the requested processor number and not larger than the upper limit used processor number stored for the earliest job, to the earliest job to activate the earliest job in the case where said judging in said step (b) is that the requested processor number stored for the earliest job is not larger than the total number of generated idle processors, wherein the assigning comprises assigning a smaller one of the number of idle processor and the upper limit used processor number stored for the earliest job to the earliest job;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor stored for that job, but a processor number assigned to that job, on the basis of the requested minimum processor number stored for that job, the processor number assigned to that job and the requested execution time stored for that job;

(e) predicting a time of lapse from a present instant of time to a time when a generation of idle processors is not smaller in number than the requested processor number stored for the earliest job on the basis of a predicted completion time instant of each job under execution;

(f) judging, which of the earliest job and one of jobs subsequent to the earliest job should be activated preferentially for improved system throughput, on the basis of at least the predicted lapse time;

(g) waiting for the generation of idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially; and, (i) executing the jobs with the processors.

3. A job execution control method in a parallel processor system comprising the steps of:

(a) storing, for each of a plurality of jobs waiting for execution thereof in the parallel processor system,
a requested processor number which is designated with respect to that job and which represents a requested minimum processor number required for executing said each job,
an upper limit used processor number representative of an upper limit number of processors to be used for each of the execution waiting jobs, and
a requested execution time which represents a maximum job execution time when that job is executed by processors equal in number to the requested processor number stored for that job;

(b) judging, at a point of time when some idle processors are generated, whether or not the requested processor number stored for an earliest one of the plurality of execution waiting jobs for which a request for execution is issued earliest is not larger than the total number of generated idle processors;

(c) assigning processors not smaller in number than the requested processor number and not larger than the upper limit used processor number stored for the earliest job, to the earliest job to activate the earliest job in the case where said judging in said step (b) is that the requested processor number stored for the earliest job is not larger than the total number of generated idle processors, and further:

detecting a minimum value of the requested minimum processor numbers stored for a plurality of subsequent execution waiting jobs;

judging whether or not the detected minimum value is not larger than a difference between the total number of generated idle processors and the requested minimum processor number stored for the earliest job; and, assigning processors equal in number to a difference between the total number of generated idle processors and the detected minimum value to the earliest job in the case where the detected minimum value is not larger than the difference between the total number of generated idle processors and the requested minimum processor number stored for the earlier job;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor stored for that job, but a processor number assigned to that job, on the basis of the requested minimum processor number stored for that job, the processor number assigned to that job and the requested execution time stored for that job;

(e) predicting a time of lapse from a present instant of time to a time when a generation of idle processors is not smaller in number than the requested processor number stored for the earliest job on the basis of a predicted completion time instant of each job under execution;

(f) judging, which of the earliest job and one of jobs subsequent to the earliest job should be activated preferentially for improved system throughput, on the basis of at least the predicted lapse time;

(g) waiting for the generation of idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially; and, (i) executing the jobs with the processors.

4. A job execution control method in a parallel processor system provided with a plurality of processors, comprising the steps of:

(a) storing, for each of a plurality of jobs waiting for execution thereof in the parallel processor system, a requested processor number which is designated with respect to that job and which represents a requested minimum processor number requested for the execution of that job, storing an upper limit used processor number representative of the upper limit number of processors to be used for each of the execution waiting jobs; and storing, for each execution waiting job, a requested execution time which represents a maximum job execution time when that job is executed by processors equal in number to the requested processor number stored for that job;

(b) judging, at a point of time when some idle processors are generated, whether or not the requested processor number stored for the earliest one of the plurality of execution waiting jobs for which a request for execution is issued earliest is not larger than the total number of generated idle processors;

(c) assigning processors not smaller in number than the requested processor number to the earliest job to activate the earliest job where said judging in said second step is that the requested processor number stored for the earliest job is not larger than the total number of generated idle processors;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor number stored for that job, but a processor number assigned to that job, on the basis of the requested minimum processor number stored for that job, the processor number assigned to that job and the requested execution time stored for that job, and predicting the instant of time of completion of each job under execution on the basis of the corrected requested execution time determined for that job and the instant of time of start of execution of that job;

(e) predicting a lapse of time from the present instant of time to the generation of generated idle processors not smaller in number than the requested processor number stored for the earliest job on the basis of the predicted completion time instant of each job under execution;

(f) judging, which of the earliest job and one of jobs subsequent to the earliest job should be activated preferentially for improved system throughput, on the basis of at least the predicted lapse of time and a cumulative wait time from the issuance of the request for execution of the earliest job to the present instant of time;

(g) waiting for the generation of the generated idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially; and (i) executing the jobs with the processors.

5. A job execution control method in a parallel processor system comprising the steps of (a) storing, for each of a plurality of jobs waiting for execution thereof in the parallel processor system, a requested processor number which is designated with respect to that job and which represents a requested minimum processor number requested for the execution of that job; and storing an upper limit used processor number representative of the upper limit number of processors to be used for each of the execution waiting jobs;

storing, for each execution waiting job, a requested execution time which represents a maximum job execution time when that job is executed by processors equal in number to the requested processor number stored for that job;

(b) judging, at a point of time when some idle processors are generated, whether or not the requested processor number stored for the earliest one of the plurality of execution waiting jobs for which a request for execution is issued earliest is not larger than the total number of generated idle processors;

(c) assigning processors not smaller in number than the requested processor number to the earliest job to activate the earliest job where said judging in said second step is that the requested processor number stored for the earliest job is not larger than the total number of generated idle processors, wherein the assigning comprises assigning a smaller one of the total number of generated idle processors and the upper limit used processor number stored for the earliest job to the earliest job;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor number stored in that job, but a processor number assigned to that job, on the basis of the requested minimum processor number stored for that job, the processor number assigned to that job and the requested execution time stored for that job, and predicting the instant of time of completion of each job under execution on the basis of the corrected requested execution time determined for that job and the instant of time of start of execution of that job;

(e) predicting a lapse of time from the present instant of time to the generation of generated idle processors not smaller in number than the requested processor number stored for the earliest job on the basis of the predicted completion time instant of each job under execution;

f) judging, which of the earliest job and one of jobs subsequent to the earliest job should be activated preferentially for improved system throughput, on the basis of at least the predicted lapse of time and a cumulative wait time from the issuance of the request for execution of the earliest job to the present instant of time;

(g) waiting for the generation of the generated idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially; and (i) executing the jobs with the processors.

6. A job execution control method in a parallel processor system comprising the steps of (a) storing, for each of a plurality of jobs waiting for execution thereof in the parallel processor system, a requested processor number which is designated with respect to that job and which represents a requested minimum processor number requested for the execution of that job; and storing an upper limit used processor number representative of the upper limit number of processors to be used for each of the execution waiting jobs;

storing, for each execution waiting job, a requested execution time which represents a maximum job execution time when that job is executed by processors equal in number to the requested processor number stored for that job;

(b) judging, at a point of time when some idle processors are generated, whether or not the requested processor number stored for the earliest one of the plurality of execution waiting jobs for which a request for execution is issued earliest is not larger than the total number of generated idle processors;

(c) assigning processors not smaller in number than the requested processor number to the earliest job to activate the earliest job where said judging in said second step is that the requested processor number stored for the earliest job is not larder than the total number of generated idle processors, and further:

detecting a minimum value of the requested minimum processor numbers stored for a plurality of subsequent execution waiting jobs;

judging whether the detected minimum value is not larger than a difference between the total number of idle processors and the requested minimum processor number stored for the earliest job; and assigning processors equal in number to a difference between the total number of generated idle processors and the detected minimum value to the earliest job in the case where the detected minimum value is not larger than the difference between the total number of generated idle processors and the requested minimum processor number stored for the earliest job;

(d) predicting an instant of time of completion of each of one or plural jobs under execution on the basis of a requested execution time stored for that job and an instant of time of start of execution of that job, where said judging in said step (b) is that the requested processor number stored for the earliest job is larger than the total number of generated idle processors by determining a corrected requested execution time representative of the maximum execution time of each job under execution when that job is executed by processors equal in number to not the requested processor number stored in that job, but a processor number assigned to that job, on the basis of the requested minimum processor number stored for that job, the processor number assigned to that job and the requested execution time stored for that job, and predicting the instant of time of completion of each job under execution on the basis of the corrected requested execution time determined for that job and the instant of time of start of execution of that job;

(e) predicting a lapse of time from the present instant of time to the generation of generated idle processors not smaller in number than the requested processor number stored for the earliest job on the basis of the predicted completion time instant of each job under execution;

(f) judging, which of the earliest job and one of jobs subsequent to the earliest job should be activated preferentially for improved system throughput, on the basis of at least the predicted lapse of time and a cumulative wait time from the issuance of the request for execution of the earliest job to the present instant of time;

(g) waiting for the generation of the generated idle processors not smaller in number than the requested processor number stored for the earliest job where said judging in said step (f) is that the earliest job should be activated preferentially;

(h) performing said steps (b) and (c) for the subsequent job where said judging in said step (f) is that the one subsequent job should be activated preferentially;

(i) storing, for each execution waiting job, a requested execution time which represents a maximum job execution time when that job is executed by processors equal in number to the requested processor number stored for that job; and, (j) executing the jobs with the processors.

* * * * *

UNITED STATES PATENT AND TRADEMARK OFFICE
CERTIFICATE OF CORRECTION

PATENT NO. : 5,752,030

DATED : May 12, 1998

INVENTOR(S) : Chisato Konno, et al.

It is certified that error appears in the above-identified patent and that said Letters Patent is hereby corrected as shown below:

Column 10, line 43, after "and" delete "."

Signed and Sealed this

Twenty-sixth Day of October, 1999

Attest:

Q. TODD DICKINSON

*Attesting Officer*  *Acting Commissioner of Patents and Trademarks*